April 18, 1950     F. S. WREFORD     2,504,777
WELDING CABLE
Filed Oct. 3, 1946
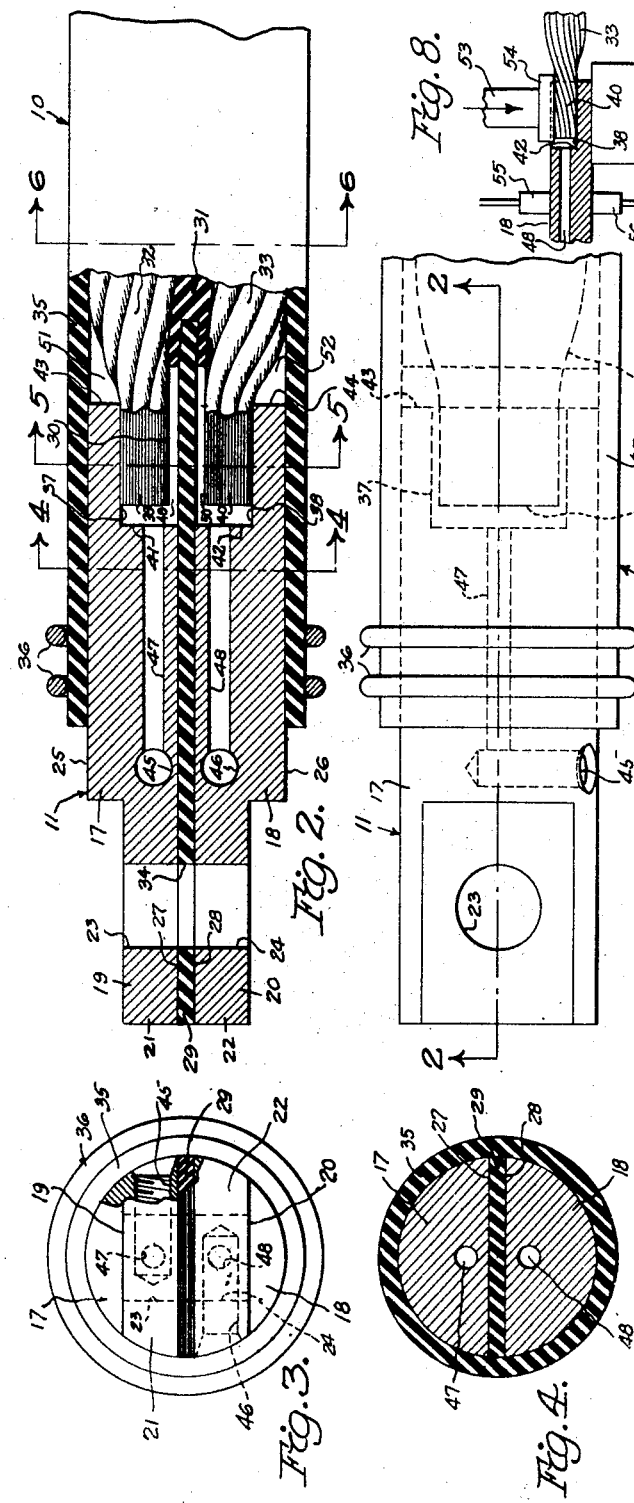
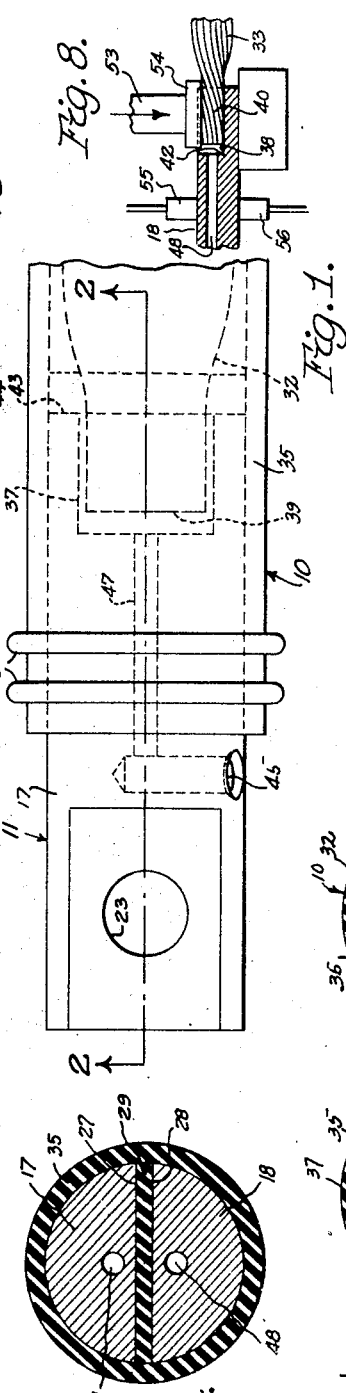
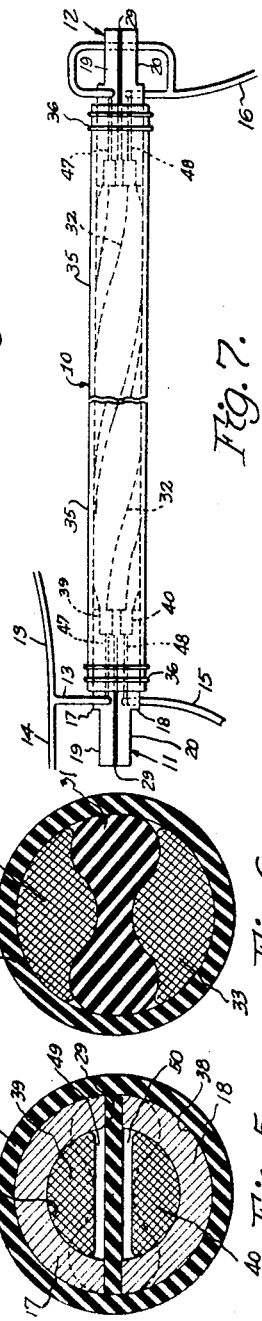
INVENTOR.
*Frederick S. Wreford*
BY *Barthel & Bugbee*
ATTYS Patented Apr. 18, 1950

2,504,777

UNITED STATES PATENT OFFICE 2,504,777

WELDING CABLE

Frederick S. Wreford, Detroit, Mich.

Application October 3, 1946, Serial No. 700,891

10 Claims. (Cl. 174—15)

This invention relates to electric welding apparatus, and in particular to electric welding cables.

One object of this invention is to provide a welding cable wherein the cable heads or terminals are split longitudinally and separated from each other by a longitudinal insulating partition instead of being separated transversely, as in prior cables, thereby facilitating assembly and repair.

Another object is to provide a welding cable wherein the cable head halves are clamped together outside the cable insulating sheath, no bolts being used and unnecessary machining operations and additional weight being thereby eliminated.

Another object is to provide an electric welding cable wherein the terminals or heads are provided with pockets into which the wires of the electrical conductors are compressed and brazed or soldered under compression, thereby insuring a junction of less resistance than in conventional cable connections.

Another object is to provide an electric welding cable wherein the terminals or cable heads are free from external projections, thereby permitting a damaged cable insulating sheath to be replaced without requiring disassembly of the cable heads or terminals.

Another object is to provide an electric welding cable with the heads or terminals and cable so constructed as to provide passageways for a series flow of cooling liquid through the space around and between the strands of one electrical conductor to the welding gun and back through the similar space around and between the strands of the remaining conductor, thereby eliminating the necessity for using an external hose for the return flow of cooling liquid.

Another object is to provide an electric welding cable, as set forth in the object immediately preceding, wherein each of the cable heads is provided with twin conduits, both of these at one end of the cable being connected to the cooling liquid discharge line, whereas one conduit at the other end is connected to the cooling liquid supply line and to the welding gun, and the other to the cooling liquid return line from the welding gun, the conduits within the cable heads being connected to spaces within the cable containing the welding current conductors so that the supply liquid passes through the cable around one conductor and through the strands thereof to the discharge line at the opposite end of the cable, and the return liquid from the gun passes similarly through the space around the other cable conductor and between its strands to the discharge line at the other end of the cable, thereby both cooling the cable and also returning the heated cooling liquid from the welding gun through the cable.

Another object is to provide a process of securing a stranded electrical conductor to a terminal by simultaneously applying heat and pressure thereto until the strands of the conductor unite in metal-to-metal union with each other and with said terminal.

Other objects and advantages of the invention will become apparent during the course of the following description of the accompanying drawings, wherein:

Figure 1 is a top plan view of one end of an electric welding cable according to a preferred form of the invention;

Figure 2 is a central vertical section through the welding cable of Figure 1, taken along the line 2—2 therein;

Figure 3 is a left hand elevation of the head of the welding cable shown in Figure 1, partly broken away to show the connection for the external liquid cooling line;

Figure 4 is a cross-section through the head of the welding cable shown in Figures 1 and 2, taken along the line 4—4 in Figure 2;

Figure 5 is a cross-section through the head of the welding cable shown in Figures 1 and 2, taken along the line 5—5 in Figure 2, and showing the connections of the welding current conductors to the terminals in the cable head;

Figure 6 is a cross-section along the line 6—6 in Figure 2, showing the arrangement of the welding current conductors within the cable;

Figure 7 is a diagrammatic side elevation of the welding cable of Figures 1 to 6 inclusive, showing the external connections thereof to the cooling liquid supply, return and discharge lines;

Figure 8 is a diagrammatic vertical section similar to part of Figure 2 showing how the end of the conductor is secured to the terminal.

Referring to the drawings in detail, Figure 7 shows a welding cable generally designated 10, according to a preferred form of the invention, as having cable heads generally designated 11 and 12 of similar construction at its opposite ends, the cable head 11 being connected to a liquid cooling supply line 13 from which a branch supply line 14 runs to a conventional welding gun, (not shown) which is electrically connected to the cable head 11. The return line 15 of cooling liquid from the welding gun is also connected to the cable head 11 as hereinafter described, and the cooling passageways in the head 12 are interconnected by a cooling liquid discharge line 16 which carries away the cooling liquid which has been heated in the welding gun and welding cable 10.

Since the welding heads 11 and 12 are of similar construction, a description of one will suffice. The welding head 11 consists of a pair of terminals 17 and 18 (Figures 1 and 2) of approximate-semi-circular cross-section and having cutaway portions 19 and 20, which are flattened off to provide connecting portions 21 and 22 respectively. The portions 21 and 22 are bolted or otherwise secured to the welding gun (not shown) by a bolt or other fastener inserted through the aligned holes 23 and 24 therein. As previously stated, the welding gun is of any conventional pattern and forms no part of the present invention. The terminals 17 and 18 have smooth external surfaces 25 and 26 of semi-cylindrical shape and are separated on their inner or flat surfaces 27 and 28 (Figure 4) by an insulating member 29 in the form of a strip of insulating material extending through the cross-diameter of the cable head 11. At its inner end, the insulating member 29 is connected as at 30 (Figure 2) to a central cable insulating member 31 having a cross section shaped like an hour glass or dumb-bell (Figure 6), and separating the two welding current conductors 32 and 33 respectively. The insulating member 29 is provided with a hole 34 aligned with the holes 23 and 24 for the passage of the bolt or other fastener by which the welding gun is connected to the cable head 11.

The welding current conductors 32 and 33 (Figure 2) are each formed of a large number of very small hair-like individual wires, groups of which are laid up in strands. The tiny wires are separate from one another by being loosely packed so that they can expand and contract individually and are separated by minute interstices through which cooling liquid can pass. These strands, as shown at the right-hand side of Figure 2, are composed of groups of hair-like individual wires which are in turn twisted spirally lengthwise into conductors of approximately semi-circular cross-section (Figure 6) separated by the elongated cable insulating member 31. The welding cable 10 as a whole is surrounded by a tubular sheath or casing 35 of insulating material such as rubber or synthetic rubber and this is clamped in assembly with the cable heads 11 and 12 by any suitable means, such as the clamping rings 36.

The terminals 17 and 18 at their inner ends are provided with pockets 37 and 38 respectively of semi-cylindrical shape for receiving the ends 39 and 40 of the welding current conductors 32 and 33 respectively. The end 39 or 40 of the cable conductor 32 or 33 is compressed into the pocket 37 or 38 by any suitable means as by the plunger 53 (Figure 8) applied to a contact member 54, such as an aluminum plate. The end 39 or 40 and the terminal 17 or 18 are then heated by being clamped between electrically energized carbon electrodes 55 and 56. Ordinary soft solder accompanied by a flux such as rosin, is then melted in the pocket 37 or 38 adjacent the end 41 or 42 thereof. The flux dissolves the oxide from the wires, the pressure sinters the wires together in copper to copper union, and the solder flows into the spaces between the wires and prevents their re-oxidation. The solder gradually seeps through the interstices between the strands of the conductor 32 or 33 and come out the other side, indicating that a sufficient amount of solder has been applied. As the wire strands making up the conductors 32 and 33 are of the order of magnitude of hairs, the solder thus passes through a large number of such interstices before it emerges at the inner ends 43 or 44 of the terminals 17 or 18. The combination of heat and high pressure, which preferably approaches 40,000 lbs., with the use of the solder as a flux, unites the cable end 39 or 40 to the terminal 17 or 18 so securely as to render these substantially inseparable thereafter, so that they cannot easily be reheated and taken apart. The aluminum contact member prevents the clamp from becoming secured to the cable end and is easily removed when the clamp is removed, leaving the cable conductor end 39 or 40 securely sealed within its respective pocket 37 or 38.

Within the cable 10 itself, the conductors 32 and 33 and the insulating member 31 are twisted longitudinally as they are united, a suitable twist, for example, being one turn in approximately every nine inches. The construction of the insulating member 31 of hour glass or dumb-bell cross-section gives an effective insulation which withstands the heat of operation satisfactorily, in contrast with the thin insulating layers of certain prior cables which burn through when they get hot. The improved cooling arrangement of the present cable also enhances its long life and additionally prevents burning through of the insulating member 31. Within the cable 10, as shown in Figure 6, the conductors 32 and 33 have cross-sections, the inner contour of which follows the contour of the insulating member 31, and has a curvature with a central arc and oppositely curved end arcs approximating the shape of an archer's bow. The outer configuration of the conductor 32 or 33 is cylindrical corresponding to the configuration of the tubular insulating sheath 35.

In order to cool the cable 10 and the welding gun attached thereto, the terminals 17 and 18 are provided with transverse threaded bores 45 and 46 extending in opposite directions (Figure 3) for connection to the cooling liquid lines 13, 15 or 16 (Figure 7). The bores 45 and 46 extend approximately into the center of the terminals 17 and 18 and join longitudinal liquid passageways 47 and 48 leading to the pockets 37 and 38 respectively. Since, as shown in Figures 2 and 5, the welding conductor ends 39 and 40 do not completely fill the pockets 37 and 38, spaces 49 and 50 are provided for the further circulation of the cooling liquid, such as water, this liquid passing into the chambers 51 and 52 (Figure 2) surrounding the conductors 32 and 33 beyond the end walls 43 and 44 of the terminals 17 and 18 within the insulating sheath 35. The liquid emerges from similar passageways and spaces in the similarly constructed cable head 12 at the opposite end of the cable 10 (Figure 7).

In operation, the conventional welding gun is mounted on the connectors 21 and 22 of the cable head 11 by a suitable fastener passing through the aligned holes 23, 34 and 24 (Figures 1 and 2) and the opposite cable head 12 is connected to a source of electric current of welding potential, this being in the neighborhood of 12 volts at a high amperage. The cooling liquid supply line 13 is connected to the bore 45 and its branch line 14 connected to the welding gun (Figure 7). The return line 15 from the welding gun is connected to the bore 46. The corresponding bores 45 and 46 in the cable head 12 at the opposite end of the cable 10 are interconnected by and to the cooling liquid discharge line 16 which carries away the heated cooling liquid from the opposite end of the cable 10.

The cooling liquid supply line 13 is then connected to a source of cooling liquid, such as cold water, the current is turned on, and welding operations are conducted in the usual manner. The cooling liquid passes from the supply line 13 through the bore 45 and passageway 47 of the cable head 11 into the pocket 37 therein, thence through the space 49 into the chamber 51 surrounding and containing the conductor 32. The passage of the electric welding current through the conductors 32 and 33 heats up the individual strands of fine wire of which these are composed. Since the current is ordinarily alternating current of sixty-cycle frequency, the fluctuation thereof causes the wires alternately to move apart and together in rapid succession. This action sucks the cooling water in and pushes it out between the interstices of the welding cable conductors 32 and 33 formed between the individual strands thereof, giving an effective cooling action and heat exchange, which prevents damage to the cable 10 by the heat generated in the passage of the electric current. The cooling water, thus heated, passes outward through the passageways 47 and 45 in the cable head 12 into the cooling liquid discharge line 16.

Meanwhile, the heated cooling liquid returning from the welding gun through the line 15 enters the bore 46 in the cable terminal 18 of the cable head 11, passes through the passageway 48 into the pocket 38, thence through the space 50 into the chamber 52 and in a similar manner, is alternately sucked in and exuded from the spaces between the strands of the cable conductor 33 in the manner described above, and passes out at the opposite end of the cable through the passageway 48 and bore 46 in the cable head 12 into the cooling liquid discharge line 16.

The low voltage of the current employed in welding and the low electrical conductivity of ordinary tap water prevents the welding conductors from being short-circuited by the flow of the cooling water.

As a modification of the process of the present invention, it has also been found that the stranded electrical conductor may be secured to the terminal without the use of solder or a flux where the surfaces are clean and where sufficient heat and pressure are applied. Under such circumstances, the strands of the conductor unite in metal-to-metal union with each other and with the terminal with a sintering-like action.

In the use of the invention as employed in supplying welding current to a so-called welding gun in spot-welding operations, it will be evident from the electrical principles concerning reactance that every time the circuit is closed to make a weld, a surge of current passes through the conductors 32 and 33 (Figure 2). Each such surge of current sets up a magnetic field around the conductors which lasts as long as current is flowing through the conductors and disappears when the current is shut off at the completion of the weld. Ordinarily, the welding current in spot-welding operations is turned on only a fraction of a second, but in many industrial manufacturing precedures, the operations call for a succession of spot welds on each workpiece and, in the case of automobile body assembly, many of these spot welds are made in succession on each body.

In the ordinary welding cable, as used in spot welding and employing conductors of circular cross-section, the reactance set up between the cables by their magnetic fields created during the flow of the current, causes the cables to "kick" or jerk apart from one another by the mutual repulsion setup between them. In the operation of the cable of the present invention, however, it will be evident from Figure 6 that the approximately semi-circular cross-section of the cable conductors and their positions with their flatter inner surfaces in close proximity to one another will greatly reduce the electrical reactance set up during the flow of the current and consequently reduce the "kick" to a negligible amount.

Furthermore, the frequent flexing of the cable during operation causes the conductors 32 and 33 to move around inside the casing 35, the twisted arrangement of the conductors 32 and 33 and insulating member 31 (Figure 7) increasing the flexibility of the cable. During such flexing, however, the thickened edge portions of the insulating member 31 (Figure 6) hold apart the edges of the conductors 32 and 33 a sufficient distance to minimize the danger of portions thereof slipping past either edge of the insulating member 31 into contact with one another, thereby causing a short circuit and possibly completely disabling the cable.

Moreover, the cable sheath or casing 35 is frequently damaged or cut open by contact with sharp metal fragments, tools or sheet metal while it is in use in a factory, and therefore requires repair or complete replacement. In prior cables, where the portions of the cable heads projected laterally beyond the bore in the cable sheath or casing, the entire cable had to be sent back to the cable manufacturer to replace or repair either the casing or the conductors because it was impossible to gain access to the interior of the cable or remove the casing without disassembling the cable head and disconnecting the conductors from the cable head portions. In the present cable, however, as stated in the fourth object above, the damaged cable insulating sheath 35 may be replaced without requiring disassembly of the cable heads or terminals merely by removing the clamping rings 36 and sliding the sheath or casing 35 longitudinally over the cable head 11 until a sufficient length of the interior of the cable is exposed or the entire casing 35 is completely removed for repairs. Thus, it is unnecessary to return the present cable to the cable manufacturer for repairs, as these repairs can be made on the job due to the longitudinally split construction of the cable heads 11 and 12 and the fact that no portion of the cable head is larger in diameter than the internal diameter of the casing 35, as is self-evident at a glance from Figures 1 and 2.

While I have shown and described my invention in detail, it is to be understood that the same is to be limited only by the appended claims, for many changes may be made without departing from the spirit and scope of my invention.

What I claim is:

1. A flexible electric welding cable comprising a tubular casing of flexible insulating material having a bore therethrough of approximately circular cross-section, a pair of flexible electrical conductors of approximately semi-circular cross-section arranged within said bore with their flatter sides spaced transversely apart from one another and having widths extending across substantially the entire width of said bore from side to side thereof, and an elongated insulating strip separate from said casing disposed loosely in the space between said conductors and extending longitudinally from end to end and laterally from side to side of said casing bore, said insulating strip having thickened opposite edge portions of materially greater thickness than the central portion thereof, each of said conductors being composed of a multiplicity of loosely-packed hair-like individual wires separated from one another by minute interstices forming cooling liquid passages, said conductors and said insulating strip being disposed loosely in said casing bore and twisted spirally as a unit lengthwise of said cable.

2. A flexible electric welding cable comprising a tubular casing of flexible insulating material having a bore therethrough of approximately circular cross-section, a pair of flexible electrical conductors of approximately semi-circular cross-section arranged within said bore with their flatter sides spaced transversely apart from one another and having width extending across substantially the entire width of said bore from side to side thereof, and an elongated insulating strip separate from said casing disposed loosely in the space between said conductors and extending longitudinally from end to end and laterally from side to side of said casing bore, said insulating strip having thickened opposite edge portions of materially greater thickness than the central portion thereof, each of said conductors being composed of a multiplicity of loosely-packed hair-like individual wires separated from one another by minute interstices forming cooling liquid passages, said conductors and said insulating strip being disposed loosely in said casing bore and twisted spirally as a unit lengthwise of said cable, said insulating strip having concave surfaces on the opposite sides thereof extending from said enlarged opposite edge portions to the thinner central portion of said strip.

3. In combination with a flexible electric welding cable having a flexible tubular casing of insulating material containing a substantially circular uniform diameter bore with a pair of minutely stranded flexible wire conductors therein and a layer of insulating material therebetween, a cable head comprising a pair of elongated approximately semi-cylindrical terminals having rearward sections disposed within said casing bore and electrically connected to said conductors, said terminals having integral forward sections projecting outwardly from said rearward sections beyond the end of said casing, said rearward and forward terminal sections having elongated inner surfaces in closely spaced proximity to one another, an elongated insulating member disposed between said inner surfaces and extending forwardly substantially to the forward ends of said terminals, the rearward section of said head within said casing being substantially cylindrical and having an external diameter substantially equal to the internal diameter of said casing bore with a sliding fit therein and the forward section of said head outside said casing having all portions thereof lying within a cylindrical surface forming a continuation of the cylindrical outer surface of the rearward section of said cable head whereby to withdraw said casing over said head without disconnecting said terminals from said cable conductors, said terminals having cooling liquid passageways therethrough extending from external ports in the forward section thereof to internal ports in the rearward section thereof opening into the 4. In combination with a flexible electric welding cable having a flexible tubular casing of insulating material containing a substantially circular uniform diameter bore with a pair of minutely stranded flexible wire conductors therein and a layer of insulating material therebetween, a cable head comprising a pair of elongated approximately semi-cylindrical terminals having rearward sections disposed within said casing bore and electrically connected to said conductors, said terminals having integral forward sections projecting outwardly from said rearward sections beyond the end of said casing, said rearward and forward terminal sections having elongated inner surfaces in closely spaced proximity to one another, an elongated insulating member disposed between said inner surfaces and extending forwardly substantially to the forward ends of said terminals, the rearward section of said head within said casing being substantially cylindrical and having an external diameter substantially equal to the internal diameter of said casing bore with a sliding fit therein and the forward section of said head outside said casing having all portions thereof lying within a cylindrical surface forming a continuation of the cylindrical outer surface of the rearward section of said cable head whereby to withdraw said casing over said head without disconnecting said terminals from said cable conductors, said terminals having cooling liquid passageways therethrough extending from external ports in the forward section thereof to internal ports in the rearward section thereof opening into the interior of said casing bore, the forward sections of said terminals having flattened outer surfaces on the opposite sides thereof whereby to connect welding apparatus thereto.

5. In combination with a flexible electric welding cable having a flexible tubular casing of insulating material containing a substantially circular uniform diameter bore with a pair of minutely stranded flexible wire conductors therein and a layer of insulating material therebetween, a cable head comprising a pair of elongated approximately semi-cylindrical terminals having rearward sections disposed within said casing bore and electrically connected to said conductors, said terminals having integral forward sections projecting outwardly from said rearward sections beyond the end of said casing, said rearward and forward terminal sections having elongated inner surfaces in closely spaced proximity to one another, an elongated insulating member disposed between said inner surfaces and extending forwardly substantially to the forward ends of said terminals, the rearward section of said head within said casing being substantially cylindrical and having an external diameter substantially equal to the internal diameter of said casing bore with a sliding fit therein and the forward section of said head outside said casing having all portions thereof lying within a cylindrical surface forming a continuation of the cylindrical outer surface of the rearward section of said cable head whereby to withdraw said casing over said head without disconnecting said terminals from said cable conductors, said terminals having cooling liquid passageways therethrough extending from external ports in the forward section thereof to internal ports in the rearward section thereof opening into the interior of said casing bore, the forward sections of said terminals and the forward section of said insulating member having aligned transversely directed clamping bolt holes ing cable having a flexible tubular casing of insulating material containing a substantially circular uniform diameter bore with a pair of minutely stranded flexible wire conductors therein and a layer of insulating material therebetween, a cable head comprising a pair of elongated approximately semi-cylindrical terminals having rearward sections disposed within said casing bore and electrically connected to said conductors, said terminals having integral forward sections projecting outwardly from said rearward sections beyond the end of said casing, said rearward and forward terminal sections having elongated inner surfaces in closely spaced proximity to one another, an elongated insulating member disposed between said inner surfaces and extending forwardly substantially to the forward ends of said terminals, the rearward section of said head within said casing being substantially cylindrical and having an external diameter substantially equal to the internal diameter of said casing bore with a sliding fit therein and the forward section of said head outside said casing having all portions thereof lying within a cylindrical surface forming a continuation of the cylindrical outer surface of the rearward section of said cable head whereby to withdraw said casing over said head without disconnecting said terminals from said cable conductors, said terminals having cooling liquid passageways therethrough extending from external ports in the forward section thereof to internal ports in the rearward section thereof opening into the interior of said casing bore. the rearward ends of said rearward terminal sections having longitudinally-extending recesses, the forward ends of said cable conductors being secured in said recess to said terminals.

7. A cable head for insertion in the flexible tubular casing of an electric welding cable, comprising a pair of elongated approximately semi-cylindrical terminals having rearward sections adapted to be mounted within the end of the casing and electrically connected to its conductors, said terminals having integral forward sections projecting outwardly from said rearward sections, said rearward and forward terminal sections having elongated inner surfaces in closely spaced proximity to one another, an elongated insulating member disposed between said inner surfaces and extending forwardly substantially to the forward ends of said terminals. the rearward section of said head being substantially cylindrical and the forward section of said head having all portions thereof lying within a cylindrical surface forming a continuation of the cylindrical outer surface of said rearward section whereby to remove said casing by drawing said casing over said head without disconnecting said terminals from the cable conductors.

8. A cable head for insertion in the flexible tubular casing of an electric welding cable, comprising a pair of elongated approximately semi-cylindrical terminals having rearward sections adapted to be mounted within the end of the casing and electrically connected to its conductors, said terminals having integral forward sections projecting outwardly from said rearward sections, said rearward and forward terminal sections having elongated inner surfaces in closely spaced proximity to one another, an elongated insulating member disposed between said inner surfaces and extending forwardly substantially to the forward ends of said terminals, the rearward section of said head being substantially cylindrical and the forward section of said head having all portions thereof lying within a cylindrical surface forming a continuation of the cylindrical outer surface of said rearward section whereby to remove said casing by drawing said casing over said head without disconnecting said terminals from the cable conductors, the forward sections of said terminals having flattened outer surfaces on the opposite sides thereof whereby to connect welding apparatus thereto.

9. A cable head for insertion in the flexible tubular casing of an electric welding cable, comprising a pair of elongated approximately semi-cylindrical terminals having rearward sections adapted to be mounted within the end of the casing and electrically connected to its conductors, said terminals having integral forward sections projecting outwardly from said rearward sections, said rearward and forward terminal sections having elongated inner surfaces in closely spaced proximity to one another, an elongated insulating member disposed between said inner surfaces and extending forwardly substantially to the forward ends of said terminals, the rearward section of said head being substantially cylindrical and the forward section of said head having all portions thereof lying within a cylindrical surface forming a continuation of the cylindrical outer surface of said rearward section whereby to remove said casing by drawing said casing over said head without disconnecting said terminals from the cable conductors, the forward sections of said terminals and the forward section of said insulating member having aligned transversely-directed clamping bolt holes therethrough.

10. A cable head for insertion in the flexible tubular casing of an electric welding cable, comprising a pair of elongated approximately semi-cylindrical terminals having rearward sections adapted to be mounted within the end of the casing and electrically connected to its conductors, said terminals having integral forward sections projecting outwardly from said rearward sections, said rearward and forward terminal sections having elongated inner surfaces in closely spaced proximity to one another, an elongated insulating member disposed between said inner surfaces and extending forwardly substantially to the forward ends of said terminals, the rearward section of said head being substantially cylindrical and the forward section of said head having all portions thereof lying within a cylindrical surface forming a continuation of the cylindrical outer surface of said rearward section whereby to remove said casing by drawing said casing over said head without disconnecting said terminals from the cable conductors, the rearward ends of said rearward terminal sections having longitudinally extending cable-connecting recesses therein.

FREDERICK S. WREFORD.

REFERENCES CITED

The following references are of record in the file of this patent:

UNITED STATES PATENTS

| Number | Name | Date |
|---|---|---|
| 1,731,218 | Adams | Oct. 8, 1929 |
| 2,308,673 | Burgett | Jan. 19, 1943 |
| 2,483,301 | Roberds | Sept. 27, 1949 |

FOREIGN PATENTS

| Number | Country | Date |
|---|---|---|
| 22,923 | Great Britain | of 1892 |
| 834,955 | France | Sept. 12, 1938 |